United States Patent
Brümmer

[15] 3,638,477
[45] Feb. 1, 1972

[54] DEVICE FOR DETERMINING THE CENTER OF GRAVITY AND/OR THE WEIGHT OF AIRPLANES

[72] Inventor: Hans Brümmer, Frankfurt am Main, Germany
[73] Assignee: Bevauge A.G., Zug, Switzerland
[22] Filed: Feb. 13, 1969
[21] Appl. No.: 798,922

[52] U.S. Cl. ............................................. 73/65, 177/211
[51] Int. Cl. .................................... G01m 1/12, G01g 3/14
[58] Field of Search ................. 73/65, 462, 65; 235/150.2, 235/150.27, 150.3, 184, 183, 197, 150.33, 193; 330/86, 110; 179/136, 137, 138

[56] References Cited

UNITED STATES PATENTS

| | | | |
|---|---|---|---|
| 2,373,504 | 4/1945 | Schlieben | 73/65 |
| 2,443,045 | 6/1948 | Magruder | 73/65 |
| 2,540,807 | 2/1951 | Berry | 73/65 |
| 3,035,773 | 5/1962 | Oto | 235/194 |
| 3,058,662 | 10/1962 | Whitesell | 235/194 |
| 3,293,424 | 12/1966 | Fisher | 235/194 |
| 3,310,976 | 3/1967 | Bussell et al. | 73/65 |

*Primary Examiner*—Richard C. Queisser
*Assistant Examiner*—John Whalen
*Attorney*—Otto John Munz

[57] ABSTRACT

Device for determining the center of gravity and the weight of airplanes with potentiometric pressure indicators by means of which latter the bearing loads being transmitted to the landing gear may be represented as electrical resistance values, comprising an analog computing circuit being charged with a constant input voltage and in the form of a counter coupled operational amplifier equipped with a series resistance and a feedback resistance, wherein the ratio of the feedback resistance to the series resistance is determined by the pressure-indicating potentiometers and whose output voltage serves as indication for the location of the center of gravity and the weight.

15 Claims, 10 Drawing Figures

INVENTOR
HANS BRUEMMER
ATTORNEY

INVENTOR
HANS BRUEMMER
BY *Otto John Munz*
ATTORNEY

DEVICE FOR DETERMINING THE CENTER OF GRAVITY AND/OR THE WEIGHT OF AIRPLANES

FIELD OF THE INVENTION

The present invention relates to a device for determining the center of gravity and/or the weight of airplanes with potentiometric pressure indicators by means of which the bearing loads or forces being transmitted to the landing gear may be represented as electrical resistance values.

The determination of the center of gravity is of great importance particularly for vertically starting airplanes. In these airplanes, the center of gravity must be positioned within a predetermined range in order that a maximum is useful load and optimum flight conditions can be attained. The determination of the location of the center of gravity is carried out in the standing position during loading by determining the respective bearing loads at appropriate points of the landing gears and by subsequently evaluating the same correspondingly.

DESCRIPTION OF THE PRIOR ART

For this purpose it is known in the art to provide potentiometric pressure indicators which measure, for example, the oil pressures in the two shock absorber legs of the main landing gears and in the shock absorber leg of the nose wheel and which produce at the output thereof the appearance of a resistance being proportional to the pressure. Coordinated to these pressure indicators is an electromechanical followup control being equipped with a bridge circuit one branch of which houses the pressure-indicating potentiometers. The bridge output is coupled, by way of an amplifier, to a control motor which, in turn, is mechanically connected to a resetting potentiometer being disposed in the other branch of the bridge circuit. A displacement of the pressure-indicating potentiometers mistunes the bridge circuit. By way of the interposed amplifier the control motor is put under voltage and displaces the sliding contact of the resetting potentiometer until the bridge circuit is once more set to zero. An indicating system being mechanically connected with the control motor serves for evaluating the forces which have been determined in this manner.

Systems with electromechanical followup controls involve great mechanical expenditure, are relatively heavy and take up a great deal of space, and have a high power absorption. It is the object of the present invention to propose a system and device for determining the center of gravity and/or the weight of airplanes with which these disadvantages and drawbacks are effectively eliminated.

SUMMARY OF THE INVENTION

For the purpose of obtaining this object, the present invention proposes that a device of the type described hereinabove is provided with a computing circuit being charged with a constant input voltage in the form of a countercoupled operational amplifier being equipped with a series resistance and a feedback resistance in which the ratio of the feedback resistance to the series resistance is determined by the pressure-indicating potentiometers and whose output voltage serves as indication for the location of the center of gravity or the weight of the airplane.

The device according to the present invention comprises as movable parts only the pressure-indicating potentiometers. Control motors, resetting potentiometers and any mechanical intermediate members are avoided. All of the required computing operations are carried out purely electronically. The expenditure necessary therefor with respect to circuit techniques is minimal. Accordingly, the device proposed by the present invention is distinguished by a low weight and small dimensions. The power absorption is low as compared to the known followup controls.

For the purpose of determining the distance of the center of gravity from the longitudinal airplane axis, a potentiometer is positioned in the negative feedback or countercoupling circuit of the operational amplifier and is adapted to be shifted in conformity with the bearing loads or forces acting upon one of the two main landing gears, and provided as series resistance of the operational amplifier is the series connection of two potentiometers one of which is adapted to be displaced or shifted in accordance with the bearing load or force acting upon one of the main landing gears, and the other one of which is adapted to be displaced or shifted in accordance with the bearing load or force acting upon the other main landing gear.

Analogously, for purposes of determining the distance of the center of gravity from the transverse airplane axis, a potentiometer is positioned in the negative feedback circuit of the operational amplifier and is adapted to be shifted in accordance with the bearing force or load acting upon the nose wheel, and provided as series resistance of the operational amplifier is the series connection of three potentiometers which are displaceable in conformity with the bearing loads or forces acting upon the two main landing gears and, respectively, the nose wheel. The connecting line of the bearing points of the main landing gear is here designated as transverse axis.

When the total weight of an airplane is intended to be determined, the series connection of three potentiometers is placed in the negative feedback circuit of the operational amplifier, and these potentiometers are displaceable in accordance with the bearing forces acting upon the two main landing gears and, respectively, upon the nose wheel, and a fixed resistor is provided as series resistance of the operational amplifier.

It is understood that the two coordinates of the center of gravity position and the total weight of the airplane may be determined simultaneously by providing, for each value to be measured, a separate operational amplifier with the respectively coordinated pressure-indicating potentiometers and, respectively, with the fixed resistor being employed for determining the total weight. For purposes of determining successively the location of the center of gravity and the weight, it is proposed—according to a modified embodiment of the present invention—that the pressure-indicating potentiometers and, respectively, the fixed resistor may be switched upon a joint operational amplifier in the correlation which may be required in each case, for example via relays or electronic switches.

For indicating the output voltage of the operational amplifier and/or amplifiers, an analog measuring apparatus may be provided. Instead of the latter, or in addition thereto, a digital voltmeter which allows for the direct reading of discrete numerical values may also be provided.

The indication of the location of the center of gravity with respect to any desired reference point of the airplane may be made in a simple manner by correspondingly calibrating the indicating instrument. Thus, the measuring instrument may be calibrated in units of the distance of the center of gravity from the transverse axis and, respectively, from the nose wheel. For other applications it may be expedient to calibrate the measuring instrument in units of the distance of the center of gravity from the ideal center of gravity location.

In accordance with a further embodiment of the present invention it is proposed that, for purposes of automatic testing, test resistances with a predetermined resistance value may be switched on to the operational amplifier instead of the pressure-indicating potentiometers. When the system is in perfect working condition, the test resistances furnish a predetermined known indicating value. It is thus possible to conveniently and securely test the serviceability of the operational amplifier, of the transmitting path and of the indicating instrument.

BRIEF DESCRIPTION OF THE DRAWINGS

The present invention will be further described hereinafter on the basis of several embodiments and taken in connection with the accompanying drawings, wherein.

DESCRIPTION OF THE PREFERRED EMBODIMENTS

The present invention makes use of the analogy of the moment equation of a carrier resting on two supports with the amplifying equation of an operational amplifier being equipped with a series resistance and a feedback resistance.

Figure 1:
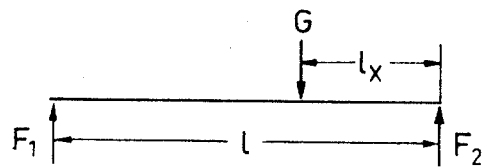
FIG. 1 is a schematic illustration of a carrier resting on two supports.

The following moment equation has validity for the carrier being disposed on two supports according to FIG. 1:

$$F_1(1-l_x) = F_2 \cdot l_x \quad (1)$$

or, transposed, $$l_x = \frac{F_1}{F_1+F_2} l \quad (2)$$

wherein $F_1$ = the bearing load or force in the left bearing surface
$F_2$ = the bearing load or force in the right bearing surface
$l$ = the mutual distance of the bearing surfaces
$l_x$ = the distance of the load G from the right bearing surface.

Figure 2:
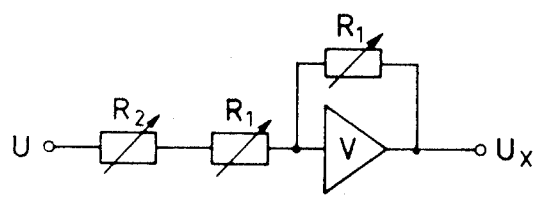
FIG. 2 illustrates a computing circuit whose voltage ratio is analogous to the moment equation of the device according to FIG. 1.

In the analog computing circuit according to FIG. 2 with the operational amplifier V having a high amplification, with the feedback resistance $R_1$ and the series resistance consisting of the series connection of the resistances $R_1$ and $R_2$, the output voltage $U_x$ for an input voltage U results from the equation $$U_x = \frac{R_1}{R_1+R_2} U \quad (3)$$

It is evident from equations (2) and (3) that the output voltage $U_x$ of the computing circuit according to FIG. 2 represents directly an indication for the distance $l_x$ of the load G from the right bearing surface according to FIG. 1 if the resistances $R_1$ in the feedback or reaction circuit and in the input circuit of the operational amplifier V are rendered proportional to the left bearing load or surface $F_1$, if the resistance $R_2$ in the input circuit of the optional amplifier V is made proportional to the right bearing force $F_2$, and if the input voltage U is made proportional to the mutual distance of the bearing surfaces.

If the conditions described hereinabove are transferred to the airplane, the location of the center of gravity in the direction of the longitudinal airplane axis, the lateral deviation of the center of gravity from the longitudinal airplane axis, and/or the total weight of the airplane may be determined in a surprisingly simple manner in accordance with the present invention.

Figure 3:
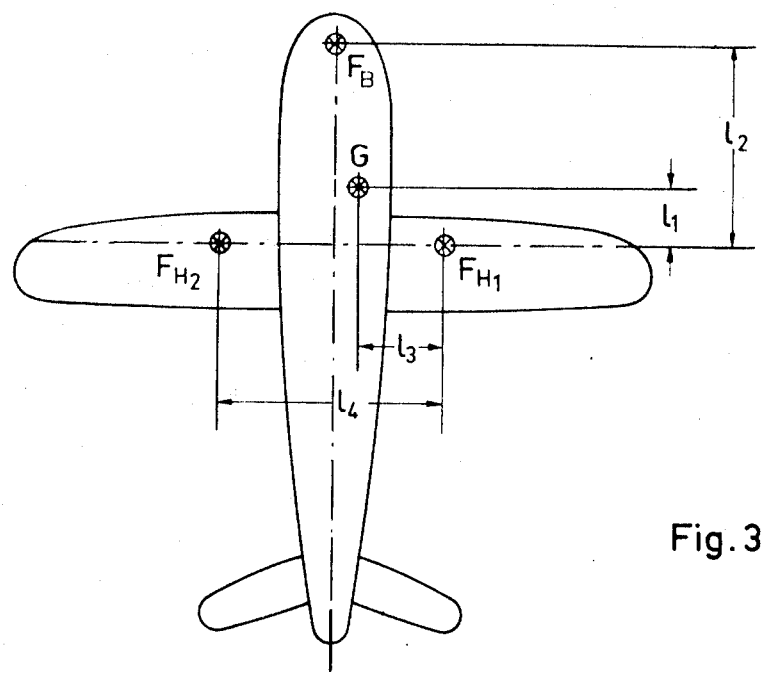
FIG. 3 is a schematic top plan view of an airplane whose center of gravity position and total weight are intended to be determined.

In FIG. 3, reference symbol G identifies the total weight of the airplane, $F_B$ is the bearing load or force in the nose wheel, $F_{H1}$ is the bearing load or force in the main landing gear 1 and $F_{H2}$ is the bearing load or force in the main landing gear 2. $l_1$ indicates the distance of the center of gravity, $l_2$ the distance of the nose wheel from the straight line connecting the main landing gears. $l_4$ is the mutual distance of the main landing gears 1 and 2, $l_3$ the shortest distance between the center of gravity and landing gear 1 projected upon the transverse airplane axis.

Figure 4:
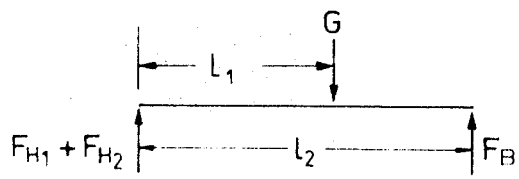
FIG. 4 shows views analogous to FIGS. 1 and 2 for the case regarding the determination of the location of the center of gravity in the direction of the longitudinal airplane axis.
Figure 4:
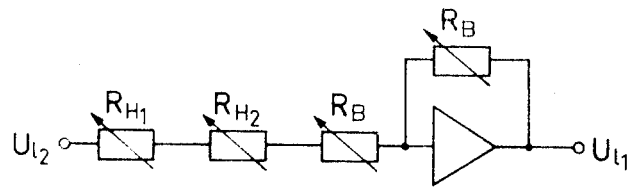

According to FIG. 4, the distance $l_1$ results, analogously to equation 2, from the equation $$l_1 = \frac{F_B}{F_B+F_{H1}+F_{H2}} l_2 \quad (4)$$

According to FIG. 2 and equation (3), the equation (4) may be represented by the computing circuit according to FIG. 4 for which the following has validity:

$$U_{11} = \frac{R_B}{R_B+R_{H1}+R_{H2}} U_{12} \quad (5)$$

If care is taken to assure that the pressure-indicating potentiometers have a resistance $R_B$ and, respectively, $R_{H1}$ and, respectively, $R_{H2}$ from the nose wheel and the two main landing gears which distance is in each case proportional to the bearing loads or forces in the nose wheel and, respectively, in the two main landing gears, and if the computing circuit is charged with a constant input voltage $U_{12}$, the output voltage $U_{11}$ of the computing circuit according to FIG. 4 will directly furnish an indication for the distance $l_1$ of the center of gravity from the straight line connecting the main landing gears. It is obvious from equation (5) that the pressure indicating potentiometer $R_B$ must be present twice.

By suitably calibrating the indicating instrument for the voltage $U_{11}$ and/or by adding the voltage $U_{11}$ with a predetermined constant voltage, the location of the center of gravity, rather than the distance $l_1$, in the direction of the longitudinal axis may be determined with respect to any desired reference point of the airplane.

Figure 5:
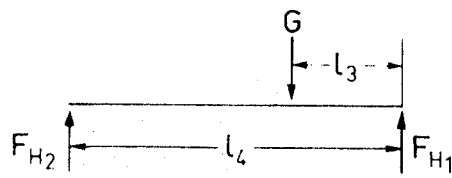
FIG. 5 shows views analogous to FIGS. 1 and 2 for the case regarding the determination of the lateral deviation of the center of gravity from the longitudinal airplane axis.
Figure 5:
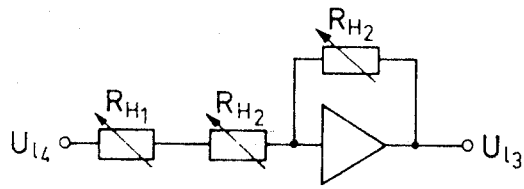

FIG. 5 illustrates schematically the conditions during the determination of the lateral deviation of the center of gravity from the longitudinal airplane axis. Analogously to equations (2) and (4), the following equation has validity for the distance $l_3$ of the center of gravity from the main landing gear 1

$$l_3 = \frac{F_{H2}}{F_{H1}+F_{H2}} l_4 \quad (6)$$

To this equation corresponds the amplifying equation of the analog computing circuit according to FIG. 5

$$U_{13} = \frac{R_{H2}}{R_{H1}+R_{H2}} U_{14} \quad (7)$$

The total weight G of the airplane is equal to the sum total of the forces $F_B$, $F_{H1}$ and $F_{H2}$. If, according to FIG. 6, the series connection of the pressure-indicating potentiometers $R_B$, $R_{H1}$ and $R_{H2}$ is placed into the reaction of feedback circuit of the operational amplifier V, and if the series resistance employed is a predetermined known resistance R, the following have validity:

$$U_G = \frac{R_B+R_{H1}+R_{H2}}{R} U \quad (8)$$

$$\frac{U}{R} = 1 \text{ unit of weight.}$$

The output voltage of the analog computing circuit is thus proportional to the total weight G.

If the values $l_1$, $l_3$ and G must be available at the same time, one potentiometer must be present in the corresponding pressure indicators for each of the values $R_B$, $R_{H1}$ and $R_{H2}$ of the equations (5), (7) and (8).

If the values are asked for successively, the resistance indicators may be switched consecutively upon an operational amplifier, for example by way of relays or electronic switches. In this case, the potentiometers $R_B$ and $R_{H2}$ must be provided in duplicate, and the potentiometer $R_{H1}$ and the fixed resistor R must be present once each.

Figure 6:
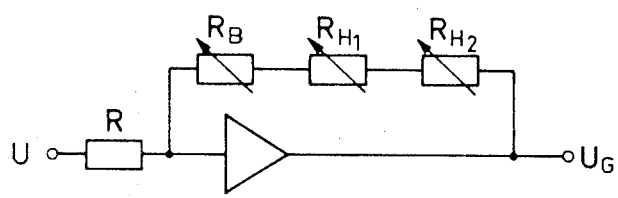
FIG. 6 shows views analogous to FIGS. 1 and 2 for the case regarding the determination of the total weight of the airplane.
Figure 7:
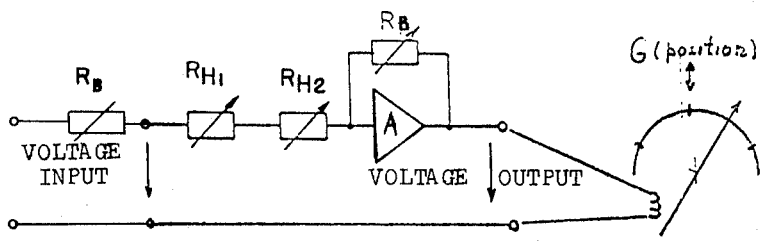
FIGS. 7 and 8 are schematic views of the measuring arrangements of the displacements of the center of gravity in the longitudinal and lateral axes respectively.
Figure 8:
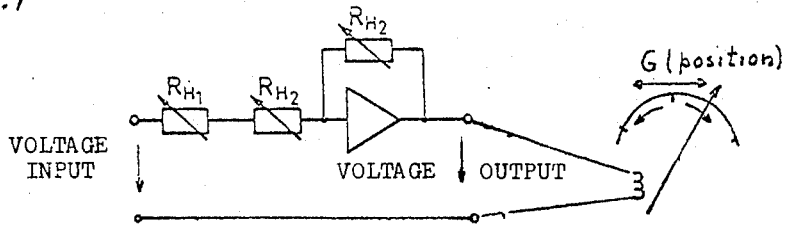
Figure 9:
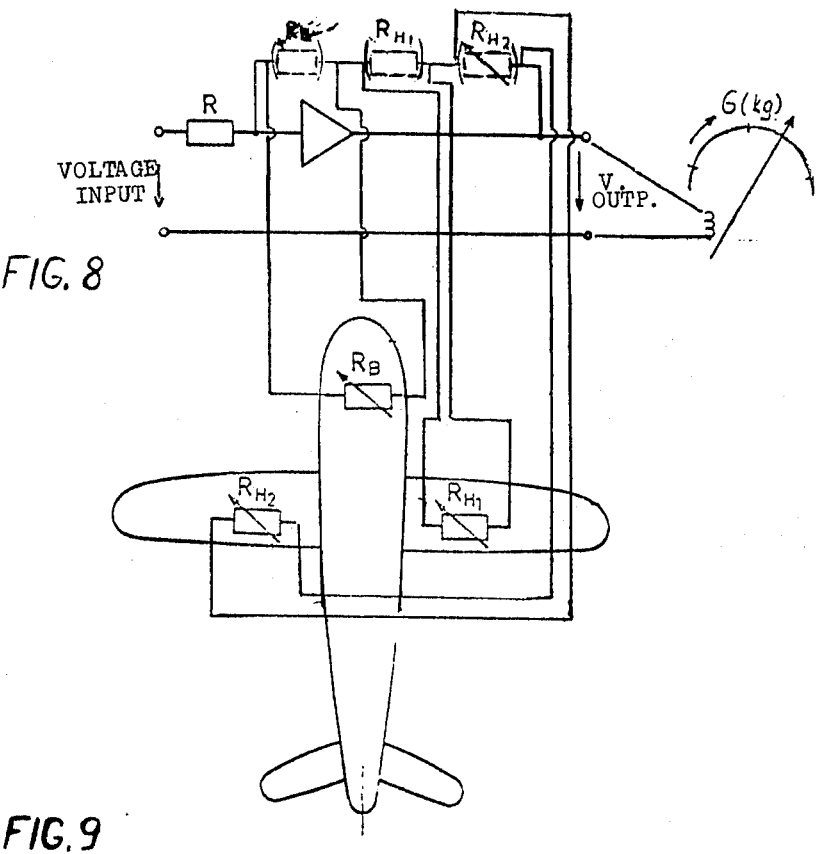
FIG. 9 is a schematic view of the measuring arrangement of the total weight of the airplane and FIG. 10 is a schematic wiring diagram of a preferred switching means of the invention.
Figure 10:
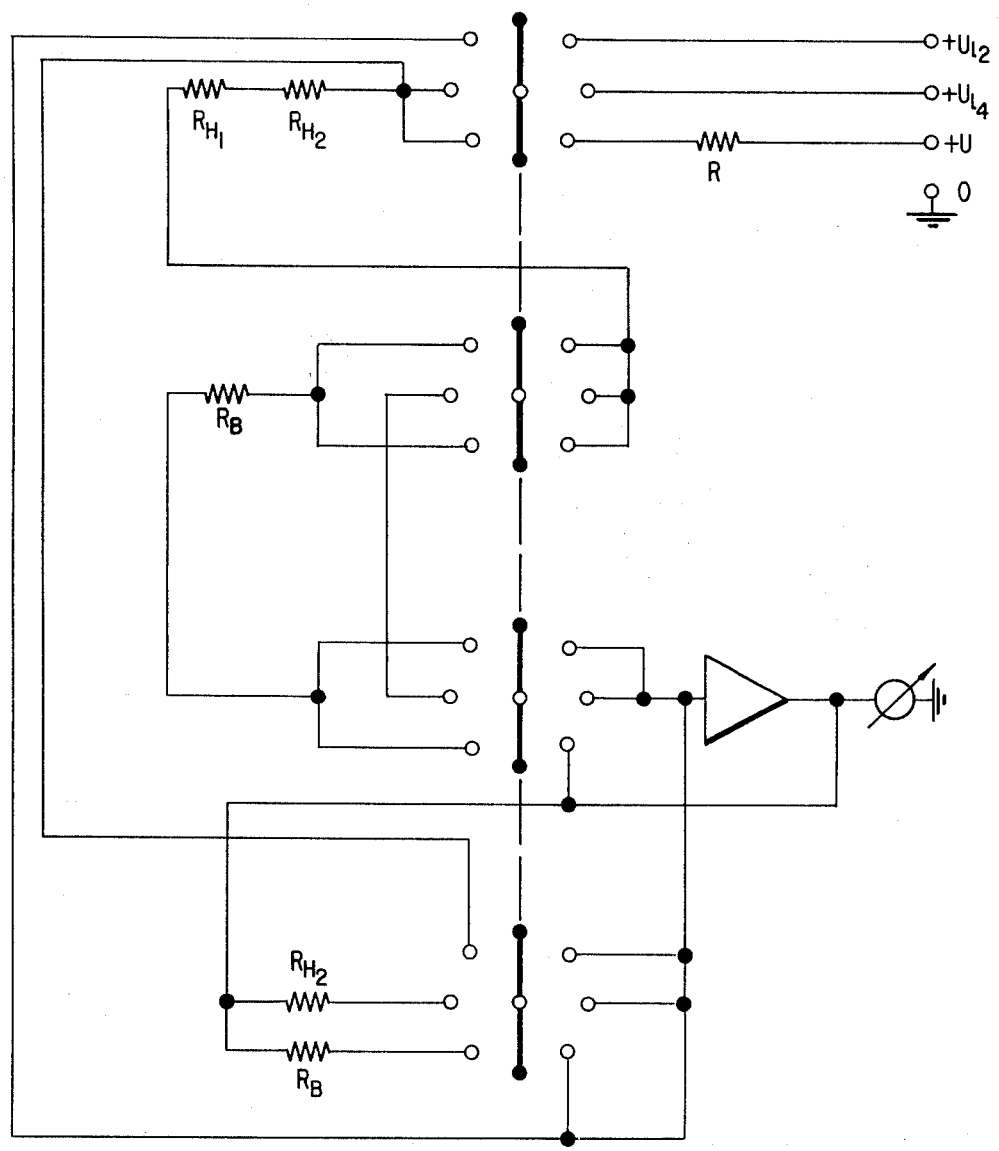

FIG. 10 is a diagrammatic view of a preferred switching means employable with the invention showing the total weight circuitry in combination with the switching circuitry, as well as the circuitry for determination of the center of gravity of the airplane in two horizontal directions perpendicular to each other, as shown in FIGS. 3 to 9. FIG. 10 shows this arrangement with the switches out of contact for possible switching to either of the positions shown in FIGS. 4, 5 or 6. When the terminals $U_{l,1}$ and $U_{l,2}$ are switched on as the circuit makers, as shown in FIG. 4, the circuit is operable to determine the distance of the center gravity in the direction of the longitudinal axis of the airplane. When the terminals $U_{l,4}$ and $U_{l,3}$ are connected, as shown in FIG. 5, the circuit is operable to determine the lateral deviation of the center of gravity from the longitudinal axis of the airplane; and when the terminals U and UG are connected, as shown in FIG. 6, the circuit is operable as the total weight circuitry. The lower resistors $R_{H2}$ and $R_B$ may be eliminated if means of switching are provided. For example, according to FIG. 5, the circuit resistor $R_{H1}$ and resistor $R_{H2}$ are switched into the circuit first; thereafter they are switched out of the circuit, and simultaneously the circuit counter connected resistor $R_{H2}$ is switched in and so forth. When this switching is repeated at a relatively high switching frequency while the time constants of the two circuits are selected, the effect of the resistors fades away only slowly after the switching and the resultant current tension $U_{l3}$ equals that shown in FIG. 10.

Various modifications are contemplated and may be obviously resorted to by those skilled in the art without departing from the spirit and scope of the invention as herein after defined by the appended claims, as only preferred embodiments thereof have been disclosed.

I claim:

1. A system for successively determining the coordinates of the center of gravity and/or the weight of an airplane comprising: at least one analog computing circuit with an operational amplifier and with pressure-responsive resistor elements disposed in the main landing gears and the nose wheel gear of said airplane, said elements converting the load dependent forces arising in the landing gears into load-dependent electrical resistance values, and a switching circuitry comprising at least one first, second and third potentiometers, each mounted on one of the said three gears respectively of the airplane for displacement in conformity with the bearing load of the respective landing gear; a fixed resistor; a first switching means to switch in said first potentiometer into the negative feedback circuit of said amplifier, and the first and second potentiometers in the series resistance of said amplifier, to determine the distance of the center of gravity from the longitudinal axis of said airplane; a second switching means to switch in said third potentiometer into the feedback resistance and said first and second potentiometers into said series resistance, to determine the distance of the center of gravity from the axis of the airplane; and a third switching means to switch in said first, second and third potentiometers into said feedback resistance and said fixed resistor into said series resistance, to determine the total weight of said airplane.

2. A system as claimed in claim 1 for indicating the output voltage of said operational amplifier, further comprising a meter connected on the output of said operational amplifier.

3. A system as claimed in claim 1 for indicating the output voltage of said amplifier, further comprising a digital voltmeter connected on the output side of said amplifier.

4. A system as claimed in claim 1, said pressure-responsive resistor elements comprising a measuring instrument provided with reference calibrations in units of the distance of the center of gravity from said landing gears and said nose gear respectively.

5. A system as claimed in claim 1, said pressure-responsive resistor elements comprising an indicating instrument provided with reference calibrations in units of the distance of the actual center of gravity from the geometrically ideal center of gravity.

6. A system as claimed in claim 1 and means for testing it automatically further comprising resistors of predetermined resistance values and means to switch over to connect said resistors with said amplifier and to switch off simultaneously said elements.

7. A system for determining the center of gravity and/or the weight of airplanes, with pressure-responsive resistor elements disposed in the main landing gears and the nose wheel gear, the elements constituting components of an analog computing circuit, the elements converting the load-dependent forces arising in the landing gears into load-dependent electrical resistance values, the circuit comprising:

a countercoupled operational amplifier having an element associated with one of the main landing gears connected as a negative feedback resistor, the amplifier being fed via a series resistance with a constant input voltage, the series resistance including load-dependent resistances of both main landing gears when the distance of the center of gravity from a longitudinal airplane axis is determined;

an element associated with the nose wheel gear connected as a negative feedback resistor and the series connection of the resistances of both main landing gears and of the nose wheel for the determination of the distance of the center of gravity from a transverse airplane axis; and the negative feedback resistance including the load-dependent resistances of both main landing gears and of the nose wheel for determining the total weight, the series resistance being constant, a first switching means to switch in succession said first potentiometer into the negative feedback circuit of a countercoupled operational amplifier, and the first and the second potentiometers in the series resistance of said amplifier, to determine the distance of the center of gravity from the longitudinal axis of said airplane; a second switching means to switch in succession said third potentiometer into the feedback resistance and said first and second potentiometers into said series resistance, to determine the distance of the center of gravity from the transverse axis of said airplane; and a third switching means to switch in succession said first, second and third potentiometers into said feedback resistance and said fixed resistor into said series resistance, to determine the total weight of said airplane.

8. The system of claim 7 together with means for detecting the output voltage from the amplifier.

9. The system of claim 7 together with a third circuit for determining the total weight of an airplane, the third circuit comprising an operational amplifier having serially connected feedback resistors connected thereacross including those of both main landing gears and that of the nose wheel gear, and a constant resistor connected to the amplifier input.

10. The system of claim 9 together with switch means for selecting operation of one of said three circuits.

11. A system as claimed in claim 7, said pressure-responsive resistors being a first and a second pressure-responsive resistor element mounted on one main landing gear, a third pressure-responsive resistor element mounted on the other main landing gear and at least one additional, a fourth pressure-responsive resistor element mounted on the nose wheel gear; further comprising one operational amplifier having a negative feedback circuit;

switching means to switch in said second pressure-responsive resistor element into the negative feedback circuit of said amplifier and said first and said third pressure-responsive element into the series resistance of said amplifier for providing an analog computing circuit to determine the distance of the center of gravity from the longitudinal airplane axis; and switching means the switch in a fixed resistor into the series resistance of said amplifier and said first, said third and said fourth pressure-responsive resistor element into the negative feedback circuit of said amplifier for providing an analog computing circuit to determine the total weight of the airplane.

12. A system as claimed in claim 11, comprising a first and a second pressure-responsive resistor element mounted on one main landing gear, a third pressure-responsive resistor element mounted on the other main landing gear and a fourth and a fifth pressure-responsive resistor element mounted on the nose wheel gear;
  one operational amplifier having a negative feedback circuit;
  switching means to switch in said second pressure-responsive resistor element into the negative feedback circuit of said amplifier and said first and said third pressure-responsive resistor elements into the series resistance of said amplifier for providing an analog computing circuit to determine the distance of the center of gravity from the longitudinal airplane switching means to switch in said first, said third and said fourth pressure-responsive resistor element into the series resistance of said amplifier and said fifth pressure-responsive resistor element into the negative feedback circuit of said amplifier for providing another analog computing circuit to determine the distance of the center of gravity from the transverse airplane axis; and/or
  switching means to switch in a fixed resistor into the series resistance of said amplifier and said first, said third and said fourth pressure-responsive resistor element into the negative feedback circuit of said amplifier for providing an analog computing circuit to determine the total weight of the airplane.

13. A system for successively determining the coordinates of the center of gravity and total weight of airplanes with pressure-responsive resistor elements disposed in the main landing gears and the nose wheel gear, the elements constituting components of analog computing circuits, the elements converting the load-dependent forces arising in the landing gears into load-dependent electrical resistance values,
  said pressure-responsive resistors being a first and a second pressure-responsive resistor element mounted on one main landing gear, a third pressure-responsive resistor element mounted on the other main landing gear, and a fourth and a fifth pressure-responsive resistor element mounted on the nose wheel gear; further comprising
  one operational amplifier having a negative feedback circuit;
  switching means to switch in said second pressure-responsive resistor element into the negative feedback circuit of said amplifier and said first and said third pressure-responsive elements into the series resistance of said amplifier for providing an analog computing circuit to determine the distance of the center of gravity from the longitudinal airplane axis;
  switching means to switch in said first, said third and said fourth pressure-responsive resistor elements into the series resistance of said amplifier and said fifth pressure-responsive resistor element into the negative feedback circuit of said amplifier for providing another analog computing circuit to determine the distance of the center of gravity from the transverse airplane axis; and
  switching means to switch in a fixed resistor into the series resistance of said amplifier and said first, said third and said fourth pressure-responsive resistor element into the negative feedback circuit of said amplifier for providing an analog computing circuit to determine the total weight of the airplane.

14. A system for simultaneously determining the coordinates of the center of gravity and/or the weight of airplanes, with pressure-responsive resistor elements disposed in the main landing gears and the nose wheel gear, the elements constituting components of analog computing circuits, the elements converting the load-dependent forces arising in the landing gears into load-dependent forces arising in the landing gears into load-dependent electrical resistance values, comprising
  an analog computing circuit for determining the center of gravity with respect to a longitudinal airplane axis, said circuit including an operational amplifier supplied with a constant input voltage via the serially connected resistances of the both main landing gears, said amplifier having a resistance associated with one of the both main landing gears connected as a negative feedback resistor across the amplifier;
  a further analog computing circuit for determining the center of gravity with respect to a transverse airplane axis, said circuit including an operational amplifier supplied with a constant input voltage via the serially connected resistances of both main landing gears and of the nose wheel gear, said amplifier having a resistance associated with the nose wheel gear connected as a negative feedback resistor across the amplifier; and
  an analog computing circuit for determining the total weight of an airplane, said circuit including an operational amplifier supplied with a constant input voltage via a constant resistor, said amplifier having a resistance associated with the nose wheel gear and the main landing gears connected in series as a negative feedback resistor across the amplifier; and
  each of said resistances included in each of said computing circuits being attached to the main landing gears and the nose wheel gear, respectively, except for said constant resistor included in said third computing circuit.

15. A system for automatically and continually determining the total weight of an airplane, the system having pressure-responsive resistor elements operatively connected to the main landing gears and the nose wheel gear of an airplane, the elements converting the load-dependent forces arising in landing gears into load-dependent resistance values, the circuit comprising an operational amplifier having serially connected feedback resistors connected thereacross including those of both main landing gears and that of the nose wheel gear, and a constant resistor connected to the amplifier input.

* * * * *